US012640075B2

(12) United States Patent
Liu et al.

(10) Patent No.: US 12,640,075 B2
(45) Date of Patent: May 26, 2026

(54) DATA VOLTAGE GENERATING CIRCUIT AND METHOD, SOURCE DRIVER AND DISPLAY DEVICE

(71) Applicant: NOVATEK MICROELECTRONICS CORP., Taiwan (CN)

(72) Inventors: I-Te Liu, Taiwan (CN); Che-Ching Chang, Taiwan (CN)

(73) Assignee: NOVATEK MICROELECTRONICS CORP., Taiwan (CN)

( * ) Notice: Subject to any disclaimer, the term of this patent is extended or adjusted under 35 U.S.C. 154(b) by 0 days.

(21) Appl. No.: 19/017,153

(22) Filed: Jan. 10, 2025

(65) Prior Publication Data

US 2026/0080811 A1 Mar. 19, 2026

Related U.S. Application Data

(60) Provisional application No. 63/695,856, filed on Sep. 18, 2024.

(30) Foreign Application Priority Data

Nov. 28, 2024 (CN) ......................... 202411724840.2

(51) Int. Cl.
*G09G 3/20* (2006.01)
*G09G 3/3233* (2016.01)
*G09G 3/3275* (2016.01)

(52) U.S. Cl.
CPC ......... *G09G 3/2007* (2013.01); *G09G 3/3233* (2013.01); *G09G 3/3275* (2013.01);
(Continued)

(58) Field of Classification Search
None
See application file for complete search history.

(56) References Cited

U.S. PATENT DOCUMENTS 8,558,767 B2 * 10/2013 Kwon .................. G09G 3/3233 315/169.3
2014/0176622 A1 * 6/2014 Jung .................... G09G 3/3233 345/76

(Continued)

FOREIGN PATENT DOCUMENTS

CN 105047157 B 10/2017
CN 116072031 A 5/2023

(Continued)

OTHER PUBLICATIONS

Office action in corresponding Taiwan application No. 113150885, dated Nov. 5, 2025.

*Primary Examiner* — Andre L Matthews
(74) *Attorney, Agent, or Firm* — MARSHALL, GERSTEIN & BORUN LLP

(57) ABSTRACT

A data voltage generating circuit and method for a display device, a source driver, and a display device are provided. The data voltage generating circuit for the display apparatus includes: an analog-to-digital converter (ADC) configured to convert an inputted power supply voltage into a power supply voltage code; an offset value determination module configured to determine, based at least in part on the power supply voltage code, an offset value for adjusting a grayscale mapping value, wherein the grayscale mapping value is a mapping value to which grayscale data corresponds; a grayscale mapping value adjustment module configured to adjust the grayscale mapping value based on the offset value to generate an adjusted mapping value; and, a digital-to-analog converter (DAC) configured to generate a data voltage for driving a data line based on the adjusted mapping value.

11 Claims, 7 Drawing Sheets

(52) U.S. Cl.
CPC ............... *G09G 2300/0842* (2013.01); *G09G 2310/027* (2013.01); *G09G 2320/0233* (2013.01); *G09G 2330/021* (2013.01); *G09G 2330/028* (2013.01)

(56) References Cited

U.S. PATENT DOCUMENTS

| | | | | |
|---|---|---|---|---|
| 2016/0240128 | A1* | 8/2016 | Kim | G09G 3/3291 |
| 2016/0293107 | A1 | 10/2016 | Jeong | |
| 2017/0140695 | A1 | 5/2017 | Guo et al. | |
| 2020/0335045 | A1* | 10/2020 | Jeong | G09G 3/3233 |
| 2021/0248943 | A1* | 8/2021 | Kim | G09G 3/20 |
| 2022/0208095 | A1 | 6/2022 | Kim et al. | |
| 2023/0089942 | A1 | 3/2023 | Shi et al. | |
| 2023/0136391 | A1 | 5/2023 | Hong et al. | |
| 2023/0137365 | A1* | 5/2023 | Hong | G09G 3/3291 345/690 |

FOREIGN PATENT DOCUMENTS

| | | | |
|---|---|---|---|
| TW | 200901134 | A | 1/2009 |
| TW | 202226195 | A | 7/2022 |

* cited by examiner

| Grayscale data | Grayscale mapping value |
|---|---|
| 0 | 682 |
| 1 | 700 |
| ... | ... |
| ... | ... |
| 159 | 2560 |
| ... | ... |
| ... | ... |
| 255 | 3583 |

DATA VOLTAGE GENERATING CIRCUIT AND METHOD, SOURCE DRIVER AND DISPLAY DEVICE

CROSS-REFERENCE TO RELATED APPLICATIONS

The present disclosure claims the priority of U.S. provisional application No. 63/695,856 filed on Sep. 18, 2024, and that of Chinese patent application No. 202411724840.2 filed on Nov. 28, 2024, the contents of which are incorporated into the present disclosure by reference in its entirety.

TECHNICAL FIELD

The present disclosure generally relates to a field of display technology, and more specifically, to a data voltage generating circuit and a data voltage generating method, a source driver and a display device.

BACKGROUND

In Active Matrix Organic Light Emitting Diode (AMOLED) display technology, the brightness of each sub-pixel mainly depends on a power supply voltage and a data voltage applied to the sub-pixel driving circuit. Typically, the power supply voltage is provided by a dedicated power supply module external to the display panel, and should have a fixed magnitude ideally. However, affected by factors such as wiring resistance, there will be deviation in the power supply voltage applied to the sub-pixel driving circuit, resulting in the display brightness of the sub-pixel being affected, thereby affecting the display quality of the display screen.

Therefore, it is necessary to control and compensate the deviation of the power supply voltage to achieve a higher quality display effect.

SUMMARY

According to an aspect of the present disclosure, there is provided a data voltage generating circuit for a display device, comprising: an analog-to-digital converter (ADC) configured to convert an inputted power supply voltage into a power supply voltage code; an offset value determination module configured to determine, based at least in part on the power supply voltage code, an offset value for adjusting a grayscale mapping value, wherein the grayscale mapping value is a mapping value to which grayscale data corresponds; a grayscale mapping value adjustment module configured to adjust the grayscale mapping value based on the offset value to generate an adjusted mapping value; and, a digital-to-analog converter (DAC) configured to generate a data voltage for driving a data line based on the adjusted mapping value.

According to another aspect of the present disclosure, there is also provided a source driver, comprising: the data voltage generating circuit as described above; and a plurality of source buffers configured to receive the data voltage generated by the data voltage generating circuit and to apply the data voltage to a corresponding data line.

According to another aspect of the present disclosure, there is also provided a display device, comprising: a display panel; and a source driver as described above, for driving the display panel.

According to another aspect of the present disclosure, there is also provided a data voltage generating method for a display device, comprising: converting an inputted power supply voltage into a power supply voltage code; determining an offset value for adjusting a grayscale mapping value based at least in part on the power supply voltage code, wherein the grayscale mapping value is a mapping value to which grayscale data corresponds; adjusting the grayscale mapping value based on the offset value to generate an adjusted mapping value; and, generating a data voltage for driving a data line based on the adjusted mapping value.

The data voltage generating circuit and method according to the embodiments of the present disclosure can adjust the data voltage based on the deviation of the power supply voltage to compensate for the deviation of the power supply voltage, so that when the power supply voltage changes, the voltage difference between the power supply voltage and the data voltage always remains unchanged, thereby ensuring the display brightness of the sub-pixels and improving the display quality. In addition, by converting the power supply voltage into a digital voltage code for performing offset value calculation to adjust the grayscale mapping value, even if different power supply voltages are provided for sub-pixels of different colors, a single compensation circuit can be used to compensate for deviations in different power supply voltages for sub-pixels of different colors, thereby reducing the number of components required and effectively reducing the size and cost of the DDIC.

BRIEF DESCRIPTION OF THE DRAWINGS

The accompanying drawings are included to provide a further understanding of the disclosure, and are incorporated in and constitute a part of this specification. The drawings illustrate embodiments of the disclosure and together with the description serve to explain the principles of the disclosure.

DETAILED DESCRIPTION

It is to be understood that other embodiments may be utilized and structural changes may be made without departing from the scope of the present disclosure. Also, it is to be understood that the phraseology and terminology used herein is for the purpose of description and should not be regarded as limitation. The use of "including", "comprising," or "having" and variations thereof herein is meant to encompass the items listed thereafter and equivalents thereof as well as additional items. Unless otherwise limited, the term "connected" and variations thereof herein are used broadly and encompass direct and indirect connections, and may include electrical or physical connections.

Figure 1:
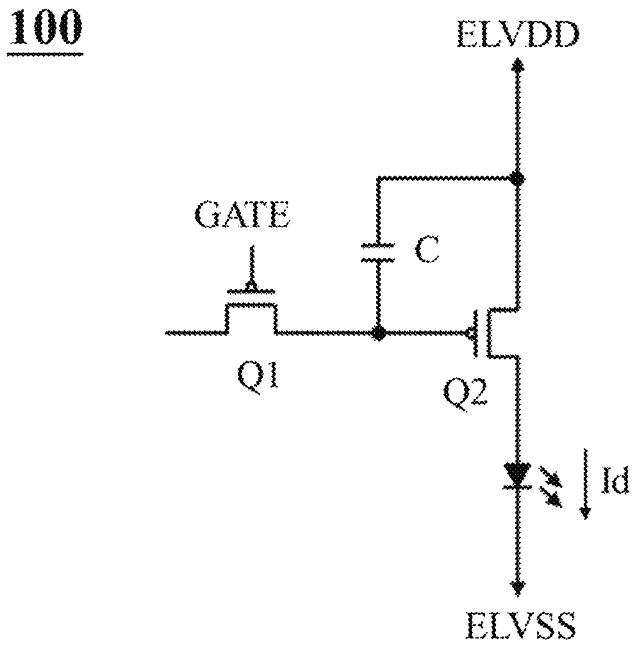
FIG. 1 shows an exemplary circuit diagram of an AMOLED sub-pixel driving circuit 100 for driving a single sub-pixel.

FIG. 1 shows an exemplary circuit diagram of an AMOLED sub-pixel driving circuit 100 for driving a single sub-pixel.

As shown in FIG. 1, the AMOLED sub-pixel driving circuit 100 includes a switching Thin Film Transistor (TFT) Q1 serving as a sub-pixel switch, a driving TFT Q2 for controlling a driving current through the sub-pixel, and a capacitor C for voltage maintenance. After a driving signal is applied to the GATE terminal of Q1 to control Q1 to be turned on, the data voltage applied to the SOURCE terminal can drive Q2 to generate a driving current Id flowing through the light-emitting diode LED1, so as to drive LED1 to emit light, where the magnitude of the driving current Id flowing through LED1 is determined by the magnitude of the power supply voltage ELVDD and the data voltage. More specifically, the magnitude of the drive current Id is equal to $k*(V_{ELVDD}-V_{data}-V_{th})^2$, where k is a constant related to the characteristics of Q2, $V_{ELVDD}$ is the power supply voltage ELVDD, $V_{data}$ is the data voltage, and $V_{th}$ is the threshold voltage of Q2. It can be seen from the above formula that the magnitude of the driving current Id is actually determined by the voltage difference between the power supply voltage ELVDD and the data voltage.

Typically, the power supply voltage ELVDD (and another power supply voltage ELVSS as shown in FIG. 1) is provided by a dedicated power supply module external to the display panel. However, affected by factors such as the wiring resistance between the power module and the display panel, there will be deviation in the power supply voltage ELVDD applied to the sub-pixel driving circuit, resulting in the magnitude of the driving current being affected, thereby affecting the display brightness of the sub-pixel. In addition, since there may be differences in the power modules and wiring resistances used by the panel manufacturer and the terminal manufacturer, these differences will cause deviation in the optical characteristics, that have been adjusted at the panel manufacturer, after the terminal manufacturer applies the display panel to the terminal, which may also cause deviation in the power supply voltage ELVDD. Therefore, the deviation of the power supply voltage ELVDD needs to be compensated to ensure display quality.

Figure 2:
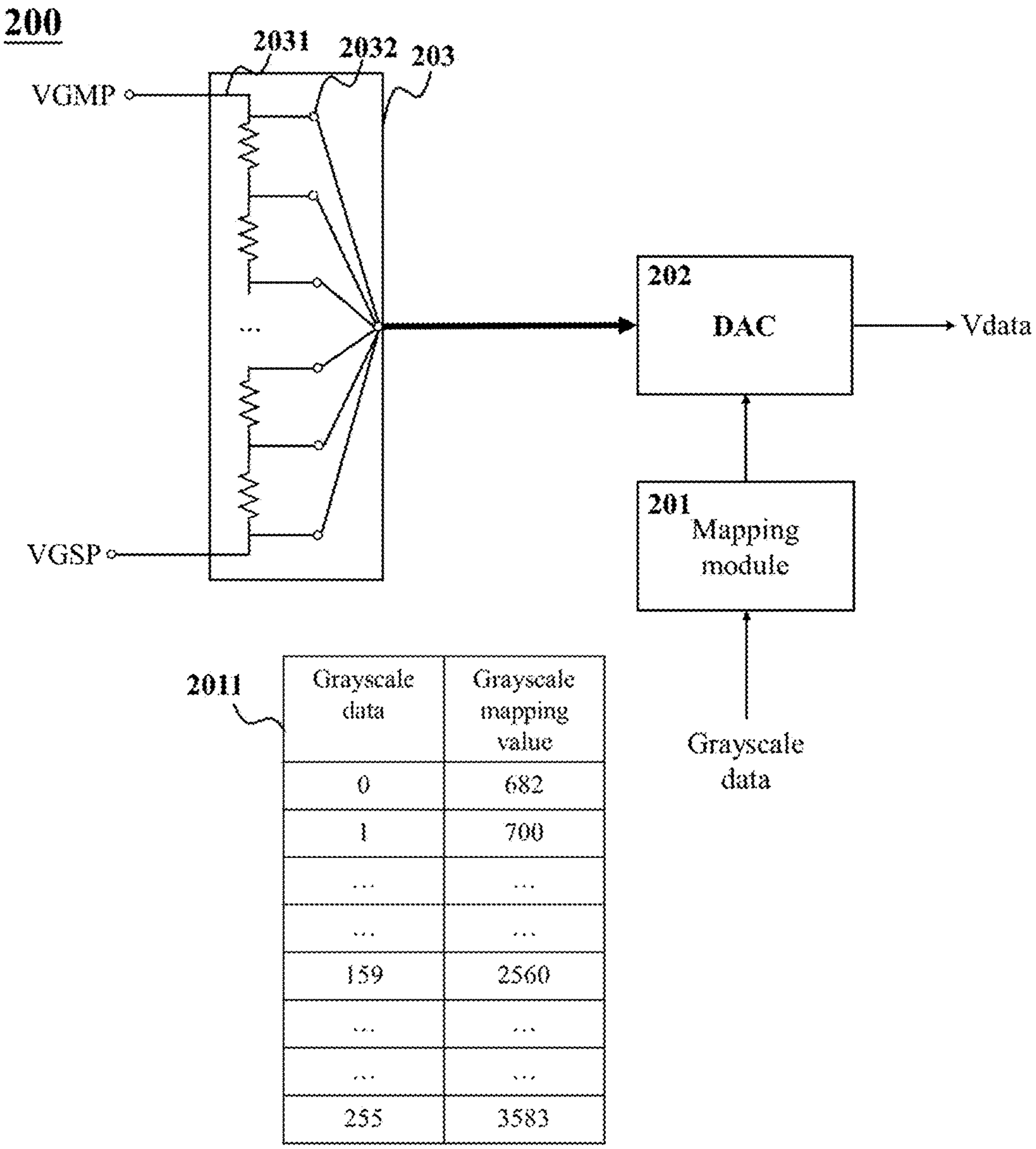
Fig. 2 (Prior Art)
FIG. 2 shows a schematic diagram of a data voltage generating circuit 200 for a display device in the prior art.

FIG. 2 shows a schematic diagram of a data voltage generating circuit 200 for a display device in the prior art. As shown in FIG. 2, the data voltage generating circuit 200 includes a mapping module 201, a digital-to-analog converter (DAC) 202, and a voltage generator 203. Among them, a mapping table, which records the correspondence between grayscale data and grayscale mapping values, is stored in the mapping module 201. For example, FIG. 2 shows a mapping table 2011, that records a 12-bit grayscale mapping value corresponding to each grayscale data from 0 to 255, as an example of the mapping table. Correspondingly, the mapping module 201 may output a grayscale mapping value corresponding to the inputted grayscale data based on the grayscale data and the stored mapping table.

The grayscale mapping value may then be used by the DAC 202 to select a corresponding voltage of the voltages provided by the voltage generator 203 as the data voltage Vdata for output. More specifically, as shown in FIG. 2, there is a resistor string 2031, which is formed by a plurality of resistors serially connected, inside the voltage generator 203, and a highest reference voltage VGMP and a lowest reference voltage VGSP are applied to the head and tail of the resistor string 2031, respectively. A plurality of output nodes 2032 corresponding to different output voltages are also provided on the resistor string 2031, whereby the voltage generator 203 can output a plurality of voltages of different magnitudes to the DAC 202. The grayscale mapping value output by the mapping module 201 may be used to select a corresponding voltage of the plurality of voltages provided by the voltage generator 203 as the data voltage Vdata output by the DAC 202.

It should be noted that the data voltage generating circuit 200 shown in FIG. 2 is only an example. In fact, the data voltage generating circuit 200 may also include more or fewer modules or components, which are not limited here.

Figure 3:
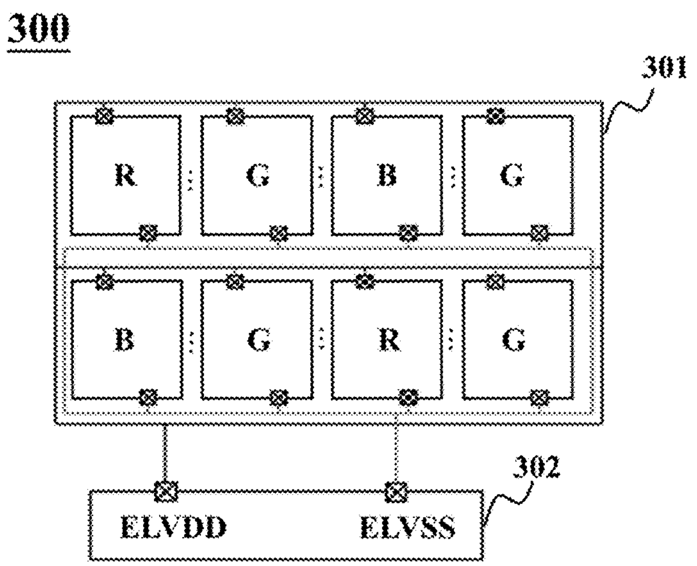
FIG. 3 shows an exemplary architecture 300 for providing a power supply voltage to a plurality of sub-pixels on a display panel.

FIG. 3 shows an exemplary architecture 300 for providing a power supply voltage to a plurality of sub-pixels on a display panel. As shown in FIG. 3, a display panel 301 includes a plurality of R/G/B sub-pixels of red, green or blue color, and these sub-pixels are provided with power supply voltages ELVDD and ELVSS through a power supply module 302, where each sub-pixel shares the same power supply voltages ELVDD and ELVSS.

Referring again to FIG. 2, in the prior art, in order to compensate for power supply voltage deviation, a deviation compensation circuit (not shown) can be used. This deviation compensation circuit can detect the magnitude of the power supply voltage ELVDD in real time and compare it with the reference value of the power supply voltage ELVDD to obtain the deviation of the power supply voltage ELVDD, thereby adjusting the highest reference voltage VGMP and the lowest reference voltage VGSP of the DAC 202 according to the deviation, so as to change the magnitude of the data voltage output by the DAC 202. As mentioned above, since the magnitude of the driving current is determined by the voltage difference between the power supply voltage ELVDD and the data voltage, the deviation of the power supply voltage ELVDD can be compensated by adjusting the magnitude of the data voltage, so that the voltage difference between the power supply voltage ELVDD and the data voltage remains unchanged, so as to ensure the display brightness of sub-pixels. In the case where the architecture shown in FIG. 3 is used to provide the power supply voltage to sub-pixels, since each sub-pixel shares the same power supply voltage ELVDD, the deviation of the power supply voltage ELVDD applied to all sub-pixels can be compensated by using a single deviation compensation circuit.

Figure 4:
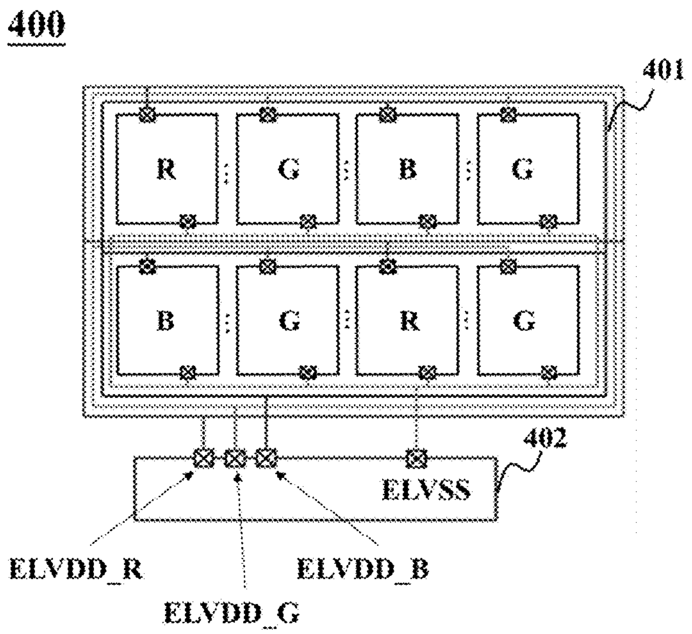
FIG. 4 shows another exemplary architecture 400 for providing a supply voltage to a plurality of sub-pixels on a display panel.

However, in order to reduce power consumption, it is possible to use an architecture different from that of FIG. 3 to provide different power supply voltages ELVDDs for sub-pixels of different colors respectively. Specifically, due to different material properties of organic light-emitting diodes (OLEDs) of different colors, OLEDs of different colors will have different luminous efficiencies, where the luminous efficiency of green OLEDs is the highest, followed by red OLEDs, and the luminous efficiency of blue OLEDs is the lowest. Accordingly, in order to drive RGB sub-pixels to emit light to display a full white picture, the voltage difference between the power supply voltage ELVDD and the data voltage required to drive green sub-pixels will be smaller than the voltage difference required to drive red sub-pixels, and both of them will be smaller than the voltage difference required to drive the blue sub-pixels. Based on the above principle, different power supply voltages ELVDDs can be provided for sub-pixels of different colors respectively, and the power supply voltages ELVDDs for green and red sub-pixels can be reduced to save power consumption. Accordingly, FIG. 4 shows another exemplary architecture 400 for providing a supply voltage to a plurality of sub-pixels on a display panel. As shown in FIG. 4, power supply voltages ELVDD_R, ELVDD_G and ELVDD_B are specifically provided for red, green and blue sub-pixels respectively. By utilizing the architecture shown in FIG. 4 to apply lower power supply voltages ELVDDs to green and red sub-pixels, when the voltage is reduced and the current remains unchanged, this architecture can achieve reduced power consumption, as compared with the architecture shown in FIG. 3 in which the sub-pixels of different colors all share the same power supply voltage ELVDD.

However, in the case where the architecture of FIG. 4 is employed to provide specific power supply voltages ELVDDs for sub-pixels of different colors, respectively, if the adjustment method to compensate for the deviation of the power supply voltage ELVDD, in which the highest reference voltage VGMP and the lowest reference voltage VGSP of the DAC are adjusted, is still employed, three deviation compensation circuits are needed to compensate for the deviations of ELVDD_R, ELVDD_G and ELVDD_B respectively, which will greatly increase the size and cost of the Display Driver Integrated Circuit (DDIC).

To this end, the present disclosure proposes a new type of data voltage generating circuit with a power supply voltage ELVDD deviation compensation function, which can achieve that, even if the architecture of FIG. 4 is used to provide different power supply voltages ELVDDs for sub-pixels of different colors, a single compensation circuit can be used to compensate for deviations in different power supply voltages ELVDDs for sub-pixels of different colors, thereby reducing the number of components required and effectively reducing the size and cost of the DDIC.

Hereinafter, for the purpose of simplicity, "power supply voltage ELVDD" is simply referred to as "power supply voltage", and unless expressly stated otherwise, "power supply voltage" appearing in this article refers to the power supply voltage ELVDD.

Figure 5:
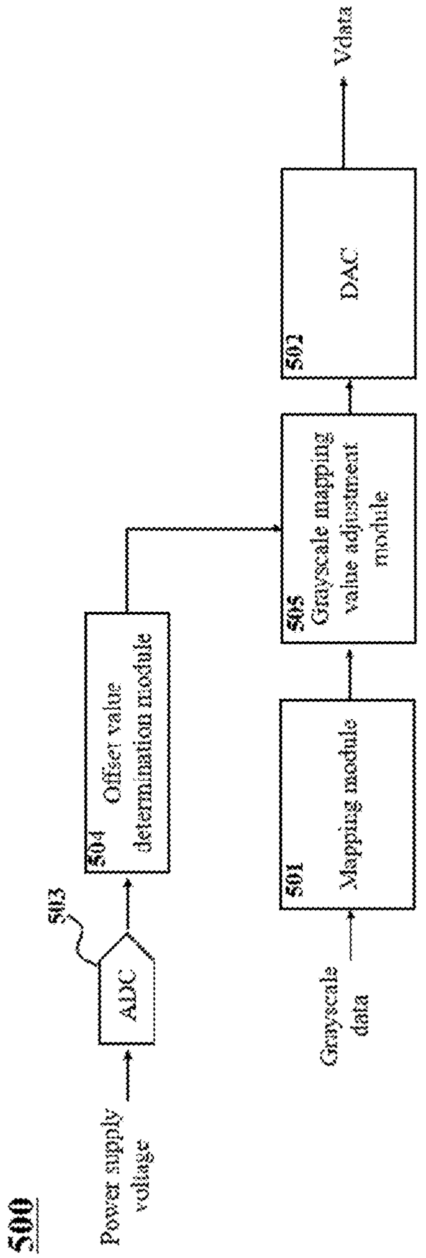
FIG. 5 shows a schematic diagram of a data voltage generating circuit 500 for a display device with a power supply voltage deviation compensation function according to an embodiment of the present disclosure.

FIG. 5 shows a schematic diagram of a data voltage generating circuit 500 for a display device with a power supply voltage deviation compensation function according to an embodiment of the present disclosure.

As shown in FIG. 5, compared with the data voltage generating circuit 200 shown in FIG. 2, in addition to a mapping module 501 and a digital-to-analog converter (DAC) 502, a data voltage generating circuit 500 according to the embodiment of the present disclosure may further include an analog-to-digital converter (ADC) 503, an offset value determination module 504 and a grayscale mapping value adjustment module 505. The specific details of the mapping module 501 and the DAC 502 may be the same as those described for the mapping module 201 and the DAC 202 in FIG. 2, and will not be described again here. In addition, in order to avoid obscuring the focus of the present invention, a voltage generator (e.g., voltage generator 203) for providing multiple voltages to the DAC for selective output thereof is omitted in FIG. 5 and subsequent FIG. 6, and those skilled in the art know that such a voltage generator may be included in the data voltage generating circuit according to the embodiments of the present invention for providing multiple voltages of different magnitudes to the DAC.

The ADC 503 may be configured to convert the inputted power supply voltage in analog form into a power supply voltage code in digital form, where the inputted power supply voltage is the actual value of the power supply voltage applied to a sub-pixel. In a case where the architecture shown in FIG. 3 is applied to each sub-pixel, the ADC 503 only needs to convert a single power supply voltage into a single power supply voltage code. However, the present disclosure is not limited thereto. As mentioned above, the architecture of FIG. 4 may be used to provide different power supply voltages for sub-pixels of different colors, and in this case, the power supply voltages shown in FIG. 5 may include power supply voltages ELVDD_R, ELVDD_G and ELVDD_B for red, green and blue sub-pixels respectively, and the ADC 503 needs to convert these three power supply voltages into corresponding power supply voltage codes. In one example, the ADC 503 can convert these three power supply voltages in a time-division manner, such as converting ELVDD_R, ELVDD_G, and ELVDD_B into corresponding power supply voltage codes one by one in sequence, so the ADC 503 can be implemented by a single ADC.

Figure 6:
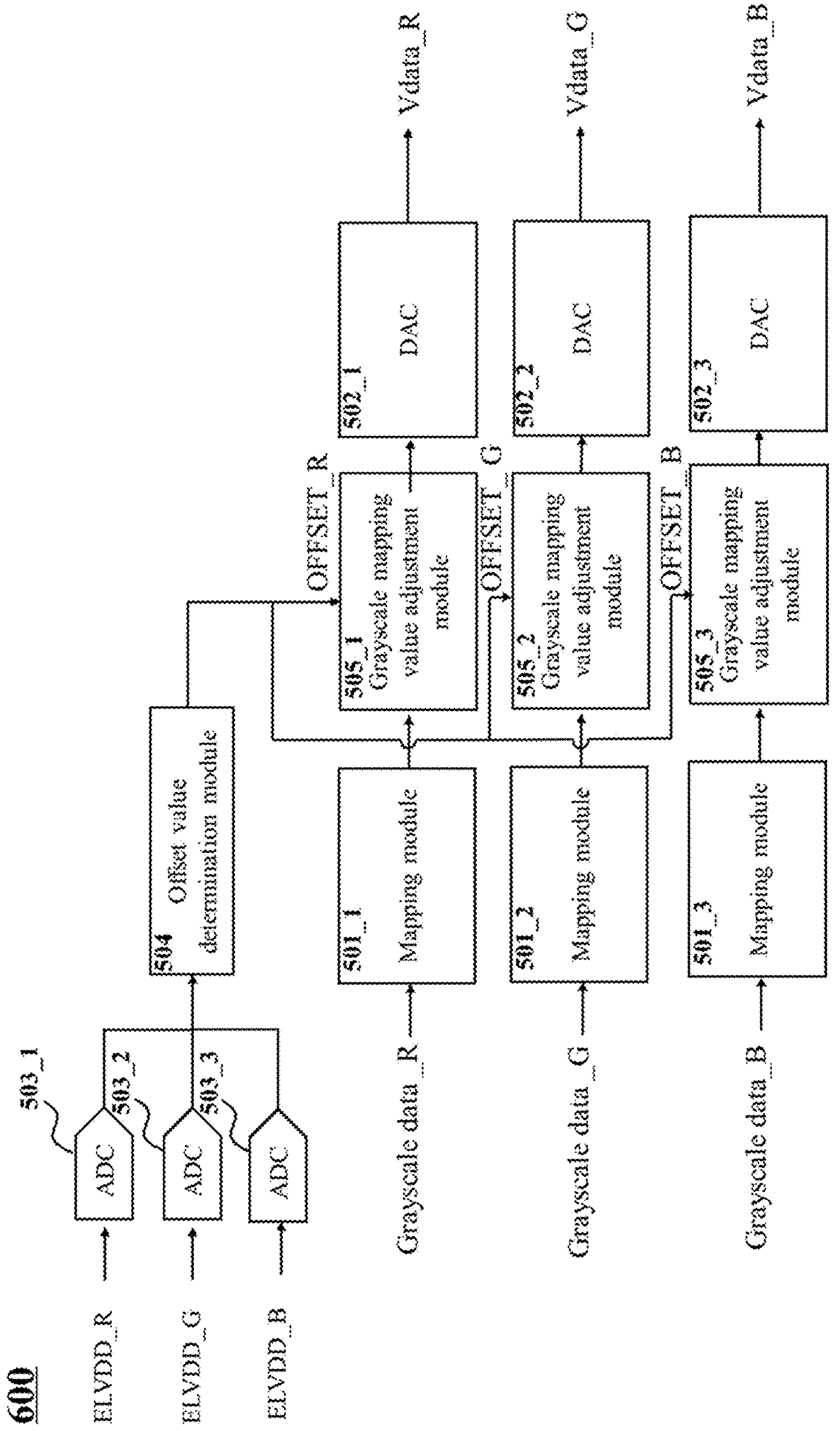
FIG. 6 shows a schematic diagram of another data voltage generating circuit 600 for a display device with a power supply voltage deviation compensation function according to an embodiment of the present disclosure.

However, in another example, in order to speed up the conversion speed for real-time operation and compensation, multiple ADCs may be used to convert multiple power supply voltages respectively simultaneously. FIG. 6 shows a schematic diagram of another data voltage generating circuit 600 for a display device with a power supply voltage deviation compensation function according to an embodiment of the present disclosure. As shown in FIG. 6, power supply voltages ELVDD_R, ELVDD_G and ELVDD_B for red, green and blue sub-pixels are converted by three ADC 503_1, 503_2 and 503_3 respectively. In addition, it is specifically shown in FIG. 6 that an offset value determination module 504 determines the offset values OFFSET_R, OFFSET_G and OFFSET_B corresponding to red, green and blue sub-pixels according to power supply voltage codes corresponding to red, green and blue sub-pixels converted by the ADC 503_1, 503_2 and 503_3, thereby adjusting grayscale mapping values of red, green and blue sub-pixels, respectively, so as to obtain data voltages Vdata_R, Vdata_G and Vdata_B for driving red, green and blue sub-pixels. Among them, each component shown in FIG. 6 can be implemented according to specific details of the corresponding component described with respect to FIG. 5 (for example, the mapping modules 503_1, 503_2 and 503_3 shown in FIG. 6 can be implemented according to specific details of the mapping module 501 described with respect to FIG. 5), which will not be described again later.

Continuing to refer to FIG. 5, the offset value determination module 504 may be configured to determine an offset value for adjusting a grayscale mapping value based at least in part on a power supply voltage code output from the ADC 503 and a power supply voltage code reference value, where the power supply voltage code reference value may be a reference value in digital form determined from the power supply voltage reference value in analog form. As mentioned above, in a case where the architecture of FIG. 4 is used to provide different power supply voltages for sub-pixels of different colors respectively, the power supply voltage code and the power supply voltage code reference value may include a plurality of power supply voltage codes and a plurality of power supply voltage code reference values corresponding to each specific sub-pixel color (e.g., red, green or blue), and the offset value determination module 504 may determine the offset value corresponding to a specific sub-pixel color based on the power supply voltage code and the power supply voltage code reference value corresponding to the specific sub-pixel color.

Figure 7:
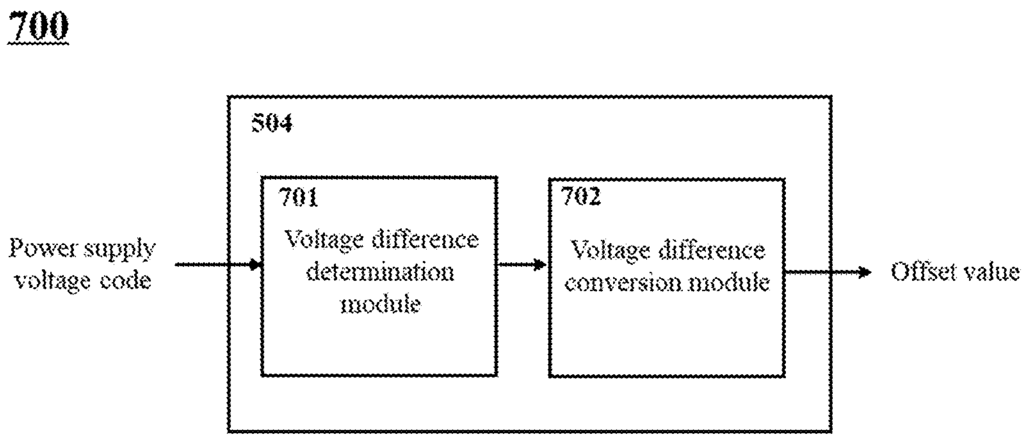
FIG. 7 shows an exemplary module diagram of the offset value determination module 504 according to an embodiment of the present disclosure.

Next, specific details of the offset value determination module 504 according to an embodiment of the present disclosure will be described. FIG. 7 shows an exemplary module diagram of the offset value determination module 504 according to an embodiment of the present disclosure. As shown in FIG. 7, the offset value determination module 504 may include a voltage difference determination module 701 and a voltage difference conversion module 702, where the voltage difference determination module 701 may be configured to determine the voltage difference based at least in part on the power supply voltage code output from the ADC 503 and the power supply voltage code reference value, and the voltage difference conversion module 702 may be configured to convert the voltage difference output from the voltage difference determination module 701 into the offset value for adjusting the grayscale mapping value.

When determining the voltage difference, the voltage difference determination module 701 may first calculate a voltage code offset based on the difference between the power supply voltage code and the power supply voltage code reference value, and then convert the voltage code offset into the voltage difference based on operating parameters of the ADC 503. More specifically, assume that ADC_OUT is the power supply voltage code, IDEAL_CODE is the power supply voltage code reference value, Vtop and Vbot are a top voltage and a bottom voltage of the ADC 503 (the magnitude of which is determined by the variation range of the power supply voltage), and K is a number of bits of the ADC 503 (that is, ADC 503 can convert an analog voltage ranging from Vbot to Vtop into a k-bit digital voltage code ranging from 0 to $2^K-1$), the voltage difference determination module 701 may determine the voltage code offset as ADC_OUT-IDEAL_CODE, and determine a per-code voltage of the ADC 503 as $$\frac{Vtop-Vbot}{2^K},$$

thereby obtaining the voltage difference $V_{DIFF}$ by multiplying the voltage code (ADC_OUT−IDEAL_CODE) by the per-code voltage $$\frac{Vtop-Vbot}{2^K}, 1$$

as follows:

$$V_{DIFF} = (\text{ADC\_OUT} - \text{IDEAL\_CODE}) * \frac{Vtop-Vbot}{2^K}$$

Subsequently, the voltage difference conversion module 702 may be configured to convert the voltage difference $V_{DIFF}$ into the offset value used to adjust the grayscale mapping value. More specifically, assume that VGMP and VGSP are the highest and lowest reference voltages of the DAC 502 respectively, N is a number of bits of the DAC 502 (i.e., the DAC 502 can convert an N-bit grayscale mapping value in the range of 0 to $2^N-1$ to an analog voltage in the range of VGMP and VGSP, where the magnitude of the VGMP and VGSP voltages are determined by the brightness range of the display panel), the voltage difference thereby conversion module 702 may determine a per-code voltage of the DAC 502 as $$\frac{VGMP-VGSP}{2^N},$$

thereby obtaining the offset value Offset_code for adjusting the grayscale mapping value by dividing the voltage difference $V_{DIFF}$ by the per-code voltage $$\frac{VGMP-VGSP}{2^N},$$

as follows:

$$\text{Offset\_code} = V_{DIFF} * \frac{2^N}{VGMP-VGSP}$$

Figure 8:
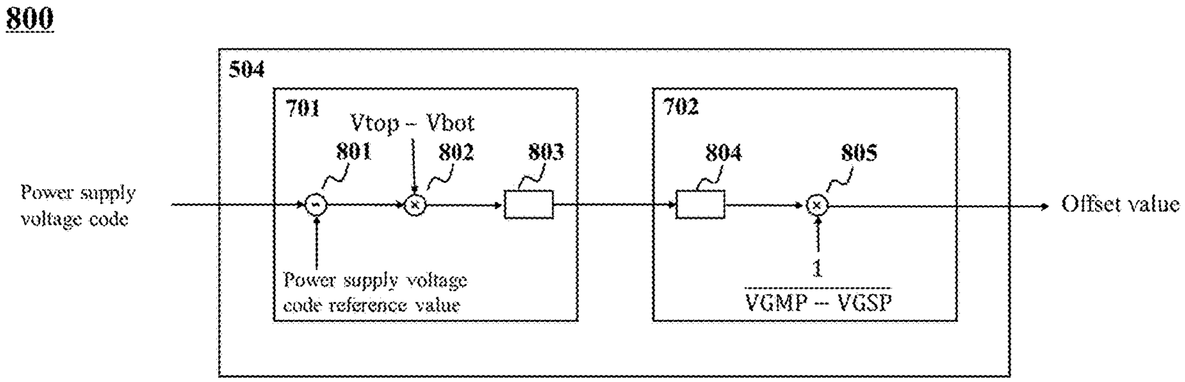
FIG. 8 shows a schematic diagram of a hardware circuit implementation of the voltage difference determination module 701 and the voltage difference conversion module 702 according to an embodiment of the present disclosure.

FIG. 8 shows a schematic diagram of a hardware circuit implementation of the voltage difference determination module 701 and the voltage difference conversion module 702 according to an embodiment of the present disclosure.

As shown in FIG. 8, the voltage difference determination module 701 may include a subtractor 801, a multiplier 802 and a shifter 803, where the subtractor 801 may be used to subtract the power supply voltage code ADC_OUT from the power supply voltage code reference value IDEAL_CODE to obtain the voltage code offset (ADC_OUT−IDEAL_CODE); the multiplier 802 may be used to multiply the voltage code offset (ADC_OUT-IDEAL_CODE) with (Vtop-Vbot); and, the shifter 803 may be used to right shift the result output by the multiplier 802 by K bits (equivalent to dividing by $2^K$ in binary operations). The voltage difference conversion module 702 may include a shifter 804 and a multiplier 805, where the shifter 804 may left shift the result output by the voltage difference determination module 701 by N bits (equivalent to multiplying by $2^N$ in binary operations), and the multiplier 805 may multiply the result output by the shifter 804 by $$\frac{1}{VGMP-VGSP}.$$

It should be noted that the hardware circuit implementation shown in FIG. 8 is only illustrative, and other ways can also be used to implement the voltage difference determination module 701 and the voltage difference conversion module 702 according to the embodiment of the present disclosure. For example, the order of some devices shown in FIG. 8 can be changed, which is not limited here.

Referring again to FIG. 5, after the offset value determination module 504 determines and outputs the offset value to the grayscale mapping value adjustment module 505, the grayscale mapping value adjustment module 505 may be configured to adjust the grayscale mapping value based on the offset value to generate an adjusted mapping value. More specifically, the grayscale mapping value adjustment module 505 may correspondingly increase or decrease the grayscale mapping value based on the offset value to obtain the adjusted mapping value. In one example, the grayscale mapping value adjustment module 505 may be implemented by an adder/subtractor.

Subsequently, after the grayscale mapping value adjustment module 505 outputs the adjusted mapping value to the DAC 502, the DAC 502 may generate the data voltage Vdata for driving the data line based on the adjusted mapping value.

In summary, the data voltage generating circuit according to the embodiments of the present disclosure can adjust the magnitude of the data voltage based on the deviation of the power supply voltage to compensate for the deviation of the power supply voltage, so that when the power supply voltage changes, the voltage difference between the power supply voltage and the data voltage always remains unchanged, thereby ensuring the display brightness of the sub-pixels and improving the display quality. In addition, by converting the power supply voltage into a digital voltage code for performing offset value calculation to adjust the grayscale mapping value, even if different power supply voltages are provided for sub-pixels of different colors, a single compensation circuit can be used to compensate for deviations in different power supply voltages for sub-pixels of different colors, reducing the number of components required and effectively reducing the size and cost of the DDIC.

Below, a source driver according to an embodiment of the present disclosure is described, which may include: the above-described data voltage generating circuit according to an embodiment of the present disclosure; and a plurality of source buffers that may be configured to receive the data voltage generated by the data voltage generating circuit and to apply the data voltage to a corresponding data line for display. Among them, the source buffers may be used to increase the driving ability of the current or voltage of the output signal to adapt to the external load (for example, the data line on the display panel).

In addition, a display device according to an embodiment of the present disclosure is also described, which may include: a display panel, and the above-described source driver according to an embodiment of the present disclosure for driving the display panel.

Figure 9:
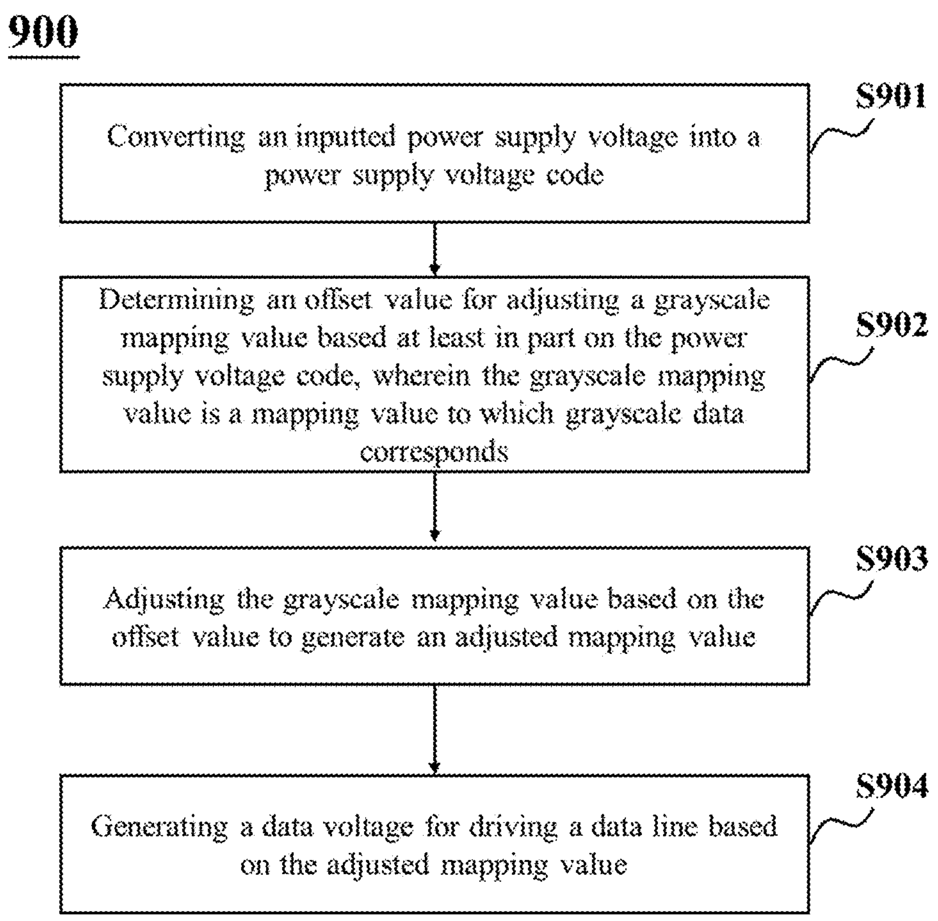
FIG. 9 shows a data voltage generating method 900 for a display device that implements power supply voltage deviation compensation according to an embodiment of the present disclosure.

Next, a data voltage generating method for a display device according to an embodiment of the present disclosure is described. FIG. 9 shows a data voltage generating method 900 for a display device that implements power supply voltage deviation compensation according to an embodiment of the present disclosure.

As shown in FIG. 9, in step S901, an inputted power supply voltage may be converted into a power supply voltage code.

In this step, the input power supply voltage is the actual value of the power supply voltage applied to the sub-pixel. As mentioned above, in the case where the architecture shown in FIG. 3 is applied to each sub-pixel, it is only necessary to convert the input single power supply voltage into a single power supply voltage code. However, the present disclosure is not limited thereto. As mentioned above, the architecture of FIG. 4 may also be used to provide different power supply voltages for sub-pixels of different colors. In this case, these multiple power supply voltages need to be converted into corresponding power supply voltage codes.

In step S902, an offset value for adjusting a grayscale mapping value may be determined based at least in part on the power supply voltage code, where the grayscale mapping value is a mapping value to which grayscale data corresponds.

In this step, determining the offset value for adjusting the grayscale mapping value based at least in part on the power supply voltage code may include: determining a voltage difference based at least in part on the power supply voltage code and a power supply voltage code reference value; and converting the voltage difference into the offset value for adjusting the grayscale mapping value.

When determining the voltage difference, the voltage code offset may first be calculated based on the difference between the power supply voltage code and the power supply voltage code reference value, and then be converted into the voltage difference based on the operating parameters of the ADC (e.g., the ADC 503 described above). More specifically, the voltage difference $V_{DIFF}$ may be calculated by the following formula:

$$V_{DIFF} = (\text{ADC\_OUT} - \text{IDEAL\_CODE}) * \frac{Vtop - Vbot}{2^K}$$

where ADC_OUT is the power supply voltage code, IDEAL_CODE is the power supply voltage code reference value, Vtop and Vbot are top and bottom voltages of the ADC respectively, and K is a number of bits of the ADC.

The voltage difference $V_{DIFF}$ may then be converted into the offset value for adjusting the grayscale mapping value based on the operating parameters of a DAC used to generate the data voltage (e.g., the DAC 502 described above). More specifically, the offset value Offset_code may be calculated as follows:

$$\text{Offset\_code} = V_{DIFF} * \frac{2^N}{VGMP - VGSP}$$

where Offset_code is the offset value, $V_{DIFF}$ is the voltage difference, VGMP and VGSP are a highest reference voltage and a lowest reference voltage of the DAC respectively, and N is a number of bits of the DAC.

In step S903, the grayscale mapping value may be adjusted based on the offset value to generate an adjusted mapping value. In this step, the grayscale mapping value may be correspondingly increased or decreased based on the offset value to obtain the adjusted mapping value.

In step S904, a data voltage for driving a data line may be generated based on the adjusted mapping value.

In summary, the data voltage generating method according to the embodiment of the present disclosure may adjust the magnitude of the data voltage based on the deviation of the power supply voltage to compensate for the deviation of the power supply voltage, so that when the power supply voltage changes, the voltage difference between the power supply voltage and the data voltage always remains unchanged, thereby ensuring the display brightness of the sub-pixel and improving the display quality. In addition, by converting the power supply voltage into a digital voltage code for performing offset value calculation to adjust the grayscale mapping value, even if different power supply voltages are provided for sub-pixels of different colors, a single compensation circuit can be used to compensate for deviations in different power supply voltages for sub-pixels of different colors, reducing the number of components required and effectively reducing the size and cost of the DDIC.

The basic principles of the present disclosure have been described above in conjunction with specific embodiments. It should be noted that the advantages, advantages, effects, etc. mentioned in the embodiments of the present disclosure are only examples and not limitations, and these advantages, advantages, effects, etc. cannot be considered to be necessary for each embodiment of the present disclosure. In addition, the specific details disclosed above are for the purpose of example and understanding only, and are not limiting, and the above details do not limit the present disclosure to the specific details must be used to practice the present disclosure. It should also be pointed out that in the device and method of the present disclosure, each component or each step can be decomposed and/or recombined. These decompositions and/or recombination should be considered equivalents of the present disclosure.

Those of ordinary skill in the art can understand that all or any part of the methods and devices of the present disclosure can be implemented in hardware, firmware, software or a combination thereof in any computing device (including processors, storage media, etc.) or a network of computing devices. The hardware can be with a general-purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Software may reside in any form of computer-readable tangible storage medium. By way of example, and not limitation, such computer-readable tangible storage media can comprise RAM, ROM, EEPROM, CD-ROM or other optical disk storage, magnetic disk storage or other magnetic storage devices, or any other tangible medium that can be used to carry or store desired program code in the form of instructions or data structures and that can be accessed by a computer. Disk, as used herein, includes compact disc (CD), laser disc, optical disc, digital versatile disc (DVD), floppy disk and blu-ray disc.

Block diagrams of elements, components, equipment, devices, and systems involved in the embodiments of the present disclosure are only illustrative examples and are not intended to require or imply that they must be connected, arranged, or configured in the manner shown in the block diagram. As a person skilled in the art will realize, these elements, components, devices, apparatuses, systems may be connected, arranged, configured in any way.

Moreover, the claimed scope of the disclosure is not limited to the particular aspects of the process, machine, manufacture, composition of matter, means, methods and actions described above. Processes, machines, manufacture, compositions of matter, means, methods, or acts, presently existing or later to be developed that perform substantially the same function or achieve substantially the same result as corresponding aspects described herein may be utilized.

Furthermore, words such as "include", "comprise", "have" and the like are open-ended words that mean "include, but not limited to", and may be used interchangeably therewith. As used herein, the words "or" and "and" mean, and are used interchangeably with, the word "and/or" unless context clearly indicates otherwise. As used herein, the word "such a" refers to, and is used interchangeably with, the phrase "such as, but not limited to".

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

The invention claimed is:

1. A data voltage generating circuit for a display device, comprising:

an analog-to-digital converter (ADC) configured to convert an inputted power supply voltage into a power supply voltage code, wherein the inputted power supply voltage is an actual value of a power supply voltage applied to a sub-pixel of the display device by a power supply module;

an offset value determination module configured to determine, based at least in part on the power supply voltage code, an offset value for adjusting a grayscale mapping value, wherein the grayscale mapping value is a mapping value to which grayscale data corresponds;

a grayscale mapping value adjustment module configured to adjust the grayscale mapping value based on the offset value to generate an adjusted mapping value; and, a digital-to-analog converter (DAC) configured to generate a data voltage for driving a data line based on the adjusted mapping value, wherein the offset value determination module comprises:

a voltage difference determination module configured to determine a voltage difference based at least in part on the power supply voltage code and a power supply voltage code reference value; and, a voltage difference conversion module configured to convert the voltage difference into the offset value for adjusting the grayscale mapping value, wherein the voltage difference determination module is configured to determine the voltage difference based on the power supply voltage code, the power supply voltage code reference value, and operating parameters of the ADC, wherein the voltage difference determination module determines the voltage difference as:

$$V_{DIFF} = (\text{ADC\_OUT} - \text{IDEAL\_CODE}) * \frac{\text{V}top - \text{V}bot}{2^K}$$

wherein, $V_{DIFF}$ is the voltage difference, ADC_OUT is the power supply voltage code, IDEAL_CODE is the power supply voltage code reference value, Vtop and Vbot are top and bottom voltages of the ADC respectively, and K is a number of bits of the ADC.

2. The data voltage generating circuit of claim 1, wherein the voltage difference conversion module is configured to convert the voltage difference into the offset value for adjusting the grayscale mapping value based on operating parameters of the DAC.

3. The data voltage generating circuit of claim 2, wherein the voltage difference conversion module determines the offset value as:

$$\text{Offset\_code} = V_{DIFF} * \frac{2^N}{VGMP - VGSP}$$

wherein, Offset_code is the offset value, $V_{DIFF}$ is the voltage difference, VGMP and VGSP are a highest reference voltage and a lowest reference voltage of the DAC respectively, and N is a number of bits of the DAC.

4. The data voltage generating circuit of claim 1, wherein the power supply voltage comprises a plurality of power supply voltages specific to a sub-pixel color; and, the ADC includes a single ADC which converts the plurality of power supply voltages in a time division manner, or, the ADC includes a plurality of ADCs which respectively convert the plurality of power supply voltages.

5. The data voltage generating circuit of claim 1, wherein the data voltage generating circuit further comprises a mapping module configured to generate the grayscale mapping value based on inputted grayscale data and a preconfigured mapping table.

6. A source driver, comprising:

the data voltage generating circuit of claim 1; and, a plurality of source buffers configured to receive the data voltage generated by the data voltage generating circuit and to apply the data voltage to a corresponding data line.

7. A display device, comprising:

a display panel; and, the source driver of claim 6, for driving the display panel.

8. A data voltage generating method for a display device, comprising:

converting an inputted power supply voltage into a power supply voltage code, wherein the inputted power supply voltage is an actual value of a power supply voltage applied to a sub-pixel of the display device by a power supply module;

determining an offset value for adjusting a grayscale mapping value based at least in part on the power supply voltage code, wherein the grayscale mapping value is a mapping value to which grayscale data corresponds;

adjusting the grayscale mapping value based on the offset value to generate an adjusted mapping value; and, generating a data voltage for driving a data line based on the adjusted mapping value, wherein determining the offset value for adjusting the grayscale mapping value based at least in part on the power supply voltage code comprises:

determining a voltage difference based at least in part on the power supply voltage code and a power supply voltage code reference value; and, converting the voltage difference into the offset value for adjusting the grayscale mapping value, wherein determining the voltage difference based at least in part on the power supply voltage code and the power supply voltage code reference value comprises:

determining the voltage difference based on the power supply voltage code, the power supply voltage code reference value, and operating parameters of an analog-to-digital converter (ADC) for converting the inputted power supply voltage into a power supply voltage code, wherein the voltage difference is determined as:

$$V_{DIFF} = (\text{ADC\_OUT} - \text{IDEAL\_CODE}) * \frac{Vtop - Vbot}{2^K}$$

wherein, $V_{DIFF}$ is the voltage difference, ADC_OUT is the power supply voltage code, IDEAL_CODE is the power supply voltage code reference value, Vtop and Vbot are top and bottom voltages of the ADC respectively, and K is a number of bits of the ADC.

9. The data voltage generating method of claim 8, wherein converting the voltage difference into the offset value for adjusting the grayscale mapping value comprises:

converting the voltage difference into the offset value for adjusting the grayscale mapping value based on operating parameters of a digital-to-analog converter (DAC) for generating the data voltage.

10. The data voltage generating method of claim 9, wherein the offset value is determined as:

$$\text{Offset\_code} = V_{DIFF} * \frac{2^N}{VGMP - VGSP}$$

wherein, Offset_code is the offset value, $V_{DIFF}$ is the voltage difference, VGMP and VGSP are a highest reference voltage and a lowest reference voltage of the DAC respectively, and N is a number of bits of the DAC.

11. The data voltage generating method of claim 8, further comprising:

generating the grayscale mapping value based on inputted grayscale data and a preconfigured mapping table before adjusting the grayscale mapping value based on the offset value.

* * * * *